United States Patent
Utaka

(10) Patent No.: US 8,680,735 B2
(45) Date of Patent: Mar. 25, 2014

(54) SEGMENT CORE FORMING STATOR CORE OF ROTARY ELECTRIC MACHINE AND METHOD FOR MANUFACTURING THE SEGMENT CORE

(75) Inventor: Ryosuke Utaka, Takahama (JP)

(73) Assignee: Denso Corporation, Kariya (JP)

( * ) Notice: Subject to any disclaimer, the term of this patent is extended or adjusted under 35 U.S.C. 154(b) by 346 days.

(21) Appl. No.: 13/083,633

(22) Filed: Apr. 11, 2011

(65) Prior Publication Data
US 2011/0248597 A1 Oct. 13, 2011

(30) Foreign Application Priority Data

Apr. 9, 2010 (JP) ................................. 2010-090394
Mar. 18, 2011 (JP) ................................. 2011-061077

(51) Int. Cl.
*H02K 1/16* (2006.01)
*H02K 3/46* (2006.01)

(52) U.S. Cl.
USPC ................ 310/216.008; 310/216.007; 29/596

(58) Field of Classification Search
USPC ..................... 310/216.008, 216.075, 216.007, 310/216.001–216.137; 29/596–598
See application file for complete search history.

(56) References Cited

U.S. PATENT DOCUMENTS

| 1,756,672 | A | * | 4/1930 | Barr ...................... 310/216.078 |
| 3,802,066 | A | * | 4/1974 | Barrett ............................ 29/596 |
| 6,927,525 | B2 | * | 8/2005 | Park et al. ..................... 310/402 |

FOREIGN PATENT DOCUMENTS

| JP | 2002-320351 | 10/2002 |
| JP | 2005-110464 | 4/2005 |

* cited by examiner

*Primary Examiner* — Tran Nguyen
*Assistant Examiner* — Leda Pham
(74) *Attorney, Agent, or Firm* — Nixon & Vanderhye P.C.

(57) ABSTRACT

A segment core forms an annular-shaped stator core of a rotary electric machine. The stator core is formed into an annular shape by circumferentially connecting a plurality of segment cores, each segment core having a L shape and includes a yoke portion that forms the outer periphery of the stator core, a tooth portion that extends from the yoke portion to the rotary axis in a radial direction of the stator core, and a steel plate where the yoke portion and the tooth portion are formed wherein one edge of the segment core linearly extends along the yoke portion and the tooth portion in the radial direction of the stator core, the other edge forms a projection in the yoke portion jutting out from the tooth portion in the circumferential direction whereby a segment core is formed into a shape of an L.

9 Claims, 6 Drawing Sheets

SEGMENT CORE FORMING STATOR CORE OF ROTARY ELECTRIC MACHINE AND METHOD FOR MANUFACTURING THE SEGMENT CORE

CROSS-REFERENCE TO RELATED APPLICATION

This application is based on and claims the benefit of priorities from earlier Japanese Patent Application Nos. 2010-090394 and 2011-061077 filed Apr. 9, 2010 and Mar. 18, 2011, respectively, the descriptions of which are incorporated herein by reference.

BACKGROUND

1. Technical Field

The present disclosure relates to sector-shaped segment cores configuring a stator core for a rotary electric machine, and a method for manufacturing the segment cores, and more specifically, to sector-shaped segment cores configuring a stator core for a rotary electric machine which is applied to a motor, a generator or the like installed such as in an electric vehicle and a hybrid vehicle, and to a method for manufacturing the segment cores.

2. Related Art

Segment cores configuring a stator core for a rotary electric machine are known. FIG. 9 shows such segment cores 1 configuring a stator core. The segment cores 1 are arranged on the side of the outer periphery of a rotor that rotates about the rotary axis of a rotary electric machine. As shown in FIG. 10, the segment cores 1 form an annular stator core 2 which is spaced apart from the rotor by a predetermined distance. Each of the segment cores 1 is made up of laminated steel plates, each having a shape of a sector corresponding to the shape of a segment which is one of the circumferential divisions of the stator core 2. Each of the segment cores 1 has a yoke portion 1y that forms the annular outer peripheral portion of the stator core 2, and a two-toothed tooth portion it in which two teeth are extended toward the inner peripheral side of the stator core 2 from the yoke portion 1y.

On the inner peripheral side of the stator core 2, a plurality of radially elongated open slots 3 are annularly arranged in the circumferential direction at regular intervals, for the insertion of windings, not shown. As shown in FIG. 11, when the segment cores 1 are manufactured, a plurality of rows of segment-core-shaped outlines (hereinafter also referred to as "segment outlines") 1a are arrayed with minimum gaps therebetween on a thin electromagnetic steel plate as a sheet member 5 unwound from a wound-up state. The segment outlines 1a on the sheet member 5 are sequentially punched using a puncher, not shown, for a plurality of times on a section-by-section basis to finally cut out segment core members 1b. The cut-out segment core members 1b are laminated to obtain a segment core 1. These type of segment cores has been well known as disclosed in JP-A-2002-320351.

In the conventional method of manufacturing the segment cores is as set forth above, each segment outline 1a has a shape of a sector. Therefore, when a plurality of rows of such segment outlines 1a are arrayed on the sheet member 5, excess regions 5a, which are not enclosed by the segment outlines 1a, are left on both longitudinal edge portions of the sheet member 5. Further, each of the segment outlines 1a has a slot-predetermined portion 3a on the outside thereof. Therefore, these slot-predetermined portions 3a also turn out to be the excess regions 5a left not enclosed by the segment outlines 1a. Such excess regions 5a and 3a will end up with wastes after the segment core members 1b are punched out. The total area occupied by the excess regions 5a and 3a in the sheet member 5 is comparatively large. Such large excess regions have raised a problem of deteriorating material yield in manufacturing segment cores.

SUMMARY

Taking the situation set forth above into consideration, the present disclosure provides segment cores of a stator core for a rotary electric machine, which are able to enhance material yield in manufacturing the segment cores, and also provides a method of manufacturing the segment cores.

An embodiment provides a segment core forming an annular-shaped stator core of a rotary electric machine that includes a rotor rotating about a rotary axis thereof, the stator core being arranged on an outer periphery side of the rotor with a predetermined distance apart therefrom and being formed into an annular shape by circumferentially connecting a plurality of segment cores, each segment core having a sector-like shape segmented from the annular-shaped stator core. The segment core includes: a yoke portion that forms the outer periphery of the stator core; a tooth portion that extends from the yoke portion to the rotary axis in a radial direction of the stator core; and a steel plate where the yoke portion and the tooth portion are formed; wherein one edge of the sector-like shape linearly extends along the yoke portion and the tooth portion in the radial direction of the stator core, the other edge of the sector shape forms a projection in the yoke portion jutting out from the tooth portion in the circumferential direction whereby a segment core is formed into a shape of an L, the steel plate is formed on a steel sheet member such that a combination of two segment outlines define the L-shape of the segment core and the segment outlines being arranged on the steel sheet member to be punched out based on the segment outlines, the L-shape defined by the segment outline includes a right-angle portion in which an inner long edge intersects an inner short edge to form a corner portion, and the two segment outlines are arranged such that a face-to-face relationship is established at least between the inner long edges or between the inner short edges in the right-angle portions of the two segment outlines.

According to the present disclosure, the segment core as a whole has a shape of an L. The steel plates configuring the segment core are formed by punching the steel sheet member. In performing punching, two segment-core-shaped outlines (hereinafter also referred to as "segment outlines") are combined and arranged on the steel sheet member such that a face-to-face relationship is established at least between the long edges or the short edges in the L-shaped right-angle portions of the combined segment outlines.

Thus, the spaces of slot-predetermined portions in the respective L-shaped right-angle portions of the combined segment outlines are mutually utilized in arranging the two segment outlines. Accordingly, the excess regions outside the segment outlines are efficiently reduced. Thus, according to the present disclosure, the excess regions, or wastes, remained after cutting out segment core members from the steel sheet member are drastically reduced to thereby enhance material yield in manufacturing the segment cores.

In the present specification, when an expression such as "the long edges are in a face-to-face relationship" or "the long edges are opposed to each other" is used, the expression refers to a state where at least a portion of one of the long edges resides in-between two perpendiculars that pass the ends of the other of the long edges. Also, when an expression such as "the short edges are in a face-to-face relationship" or "the short edges are opposed to each other" is used, the expression refers to a state where at least a portion of one of the short edges resides in-between two perpendiculars that pass through the ends of the other of the short edges.

The embodiment also provides a method for manufacturing a segment core forming an annular-shaped stator core of a rotary electric machine that includes a rotor rotating about a rotary axis thereof, the stator core being arranged on an outer periphery side of the rotor with a predetermined distance apart therefrom and being formed into an annular shape by circumferentially connecting a plurality of segment cores, each segment core having a sector-like shape segmented from the annular-shaped stator core, the segment core including a yoke portion that forms the outer periphery of the stator core; a tooth portion that extends from the yoke portion to the rotary axis in a radial direction of the stator core; and a steel plate where the yoke portion and the tooth portion are formed; wherein one edge of the sector-like shape linearly extends along the yoke portion and the tooth portion in the radial direction of the stator core, the other edge of the sector shape forms a projection in the yoke portion jutting out from the tooth portion in the circumferential direction whereby a segment core is formed into a shape of an L, the method includes steps of: forming the steel plate on a steel sheet member such that a combination of two segment outlines define the L-shape of the segment core and the segment outlines being arranged on the steel sheet member, the L-shape defined by the segment outline including a right-angle portion in which an inner long edge intersects an inner short edge to form a corner portion; arranging two segment outlines such that a face-to-face relationship is established at least between the inner long edges or between the inner short edges in the right-angle portions of the two segment outlines; punching out the steel plate from the steel sheet member based on the two segment outlines; and laminating the steel plate which is punched out from the steel sheet member to produce the segment core.

According to the present disclosure, in combining and arranging two segment outlines on the steel sheet member at the first step, it is ensured that a face-to-face relationship is established at least between the long edges or between the short edges in the L-shaped right-angle portions of the two segment outlines.

Thus, the spaces of slot-predetermined portions in the respective L-shaped right-angle portions of the combined segment outlines are mutually utilized in arranging the two segment outlines. Accordingly, the excess regions outside the segment outlines are effectively reduced. Thus, according to the present disclosure, the excess regions, or wastes, remained after cutting out segment core members from the steel sheet member are drastically reduced to thereby enhance material yield in manufacturing the segment cores.

According to the embodiment, the method includes a step of arranging the two segment outlines in combination as a minimum unit of combination, and arranging a plurality of units to be arrayed in a widthwise direction perpendicular to a longitudinal direction of the steel sheet member.

According to the present disclosure, space efficiency in the array is enhanced, and thus material yield in manufacturing the segment cores is more favorably enhanced.

According to the embodiment, the method includes a step of arranging two segment outlines such that a face-to-face relationship is established between the inner long edges and between the inner short edges in the right-angle portions of the two segment outlines.

According to the present disclosure, the spaces of slot-predetermined portions in the respective L-shaped right-angle portions are most efficiently used. Thus, the excess regions outside the segment outlines are reduced to a maximum extent.

According to the embodiment, the method includes a pilot hole used for conveyance of the steel member which is provided in excess regions each having at least three directions confronting the segment outlines According to the present disclosure, the pilot holes are provided by effectively utilizing the excess regions each having at least three directions confronting the segment outlines. Further, owing to the provision of the pilot holes, the punching process for the steel sheet member is accurately and stably performed.

DETAILED DESCRIPTION OF THE PREFERRED EMBODIMENTS

With reference to the accompanying drawings, hereinafter is described an embodiment of the present disclosure.

Figure 1:
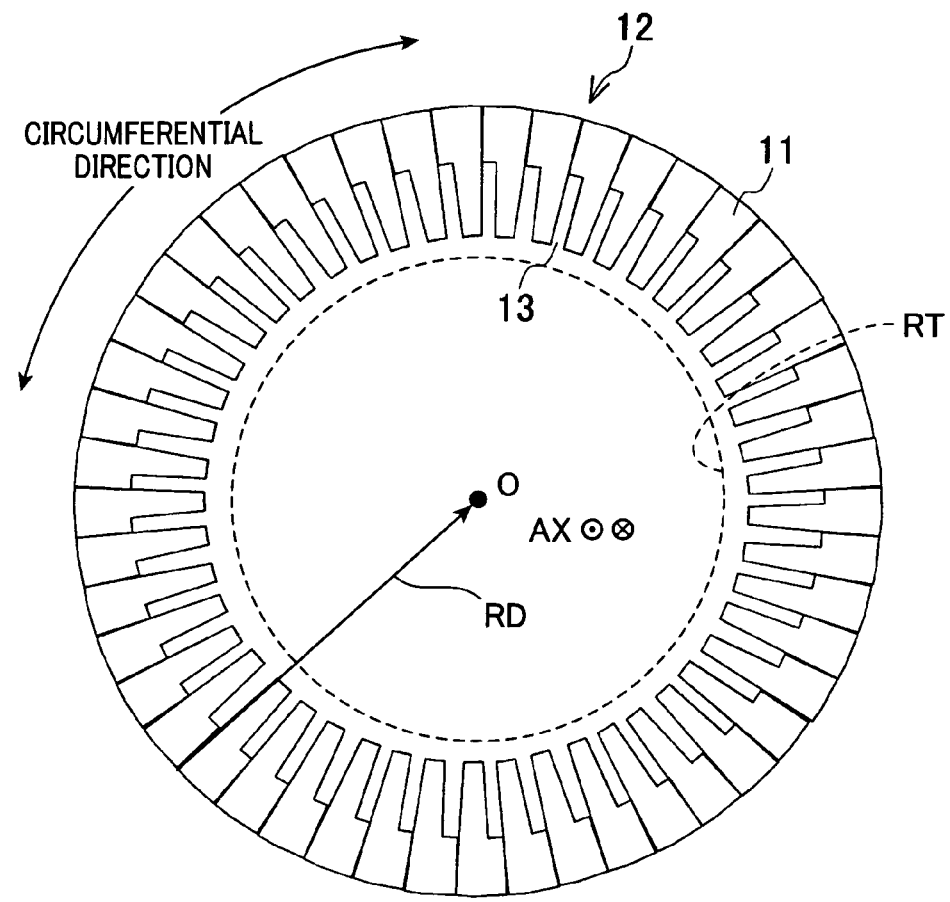
FIG. 1 is a plan view illustrating the configuration of a stator core for a rotary electric machine, in which segment cores according to an embodiment of the present disclosure are used.
Figure 2:
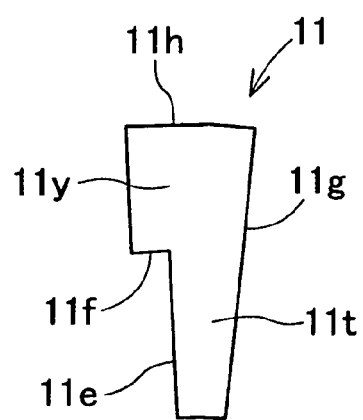
FIG. 2 is a plan view illustrating one of the segment cores according to the embodiment.

FIG. 1 is a plan view illustrating the configuration of a stator core for a rotary electric machine, in which segment cores 11 according to the present embodiment are used. FIG. 2 is a plan view illustrating one of the segment cores 11 according to the present embodiment. In FIG. 1, reference symbols RD, RT, O and AX represent radial direction of the stator core, rotor, the center of the rotor, axial direction of the rotor respectively.

The segment cores 11 according to the present embodiment are arranged on the side of the outer periphery of a rotor that rotates about the rotary axis (i.e., rotary shaft) of a rotary electric machine. As shown in FIG. 1, the segment cores 11 form an annular-shaped stator core 12 which is spaced apart from the rotor by a predetermined distance. The stator core 12 has yoke portions 11y that form the annular outer peripheral portion of the stator core 12 and a plurality of tooth portions 11t that extend inward from the yoke portions 11y. The stator core 12 is formed into an annular shape by circumferentially connecting the plurality of segment cores 11. In other words, the stator core 12 is circumferentially sectioned at every tooth portion 11t.

As shown in FIG. 2, each segment core 11 has a sector-like shape. One edge of the sector-like shape linearly extends along the yoke portion 11y and the tooth portion 11t in the radial direction of the stator core 12. The other edge of the sector-like shape forms a projection in the yoke portion 11y, jutting out from the tooth portion 11t in the circumferential direction. Thus, the segment core 11 is formed into a shape of an L (formed into substantially a shape of a sector) as a whole.

The L-shaped segment core 11 has a right-angle (substantially right angle) portion in which a long edge (referred to as "inner long edge") 11e intersects a short edge (referred to as "inner short edge") 11f to form a corner. The segment core 11 also has an acute-angle portion in which a long edge (referred to as "outer long edge") 11g intersects a short edge (referred to as "outer shot edge") 11h to form a corner portion. The segment core 11 is formed by laminating electromagnetic steel plates each having a shape of an L (referred to as "L-shape"), as viewed from the top, in the axial direction of the stator core 12 (axial direction of the rotor).

Figure 3:
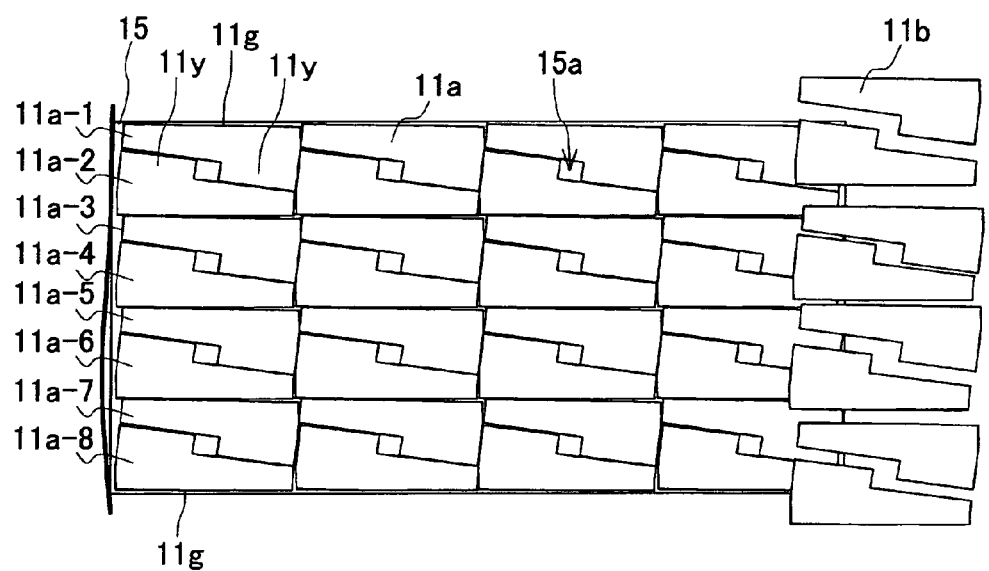
FIG. 3 is a plan view illustrating segment-core-shaped outlines arrayed on a steel sheet member, and segment core members, according to the embodiment.
Figure 4:
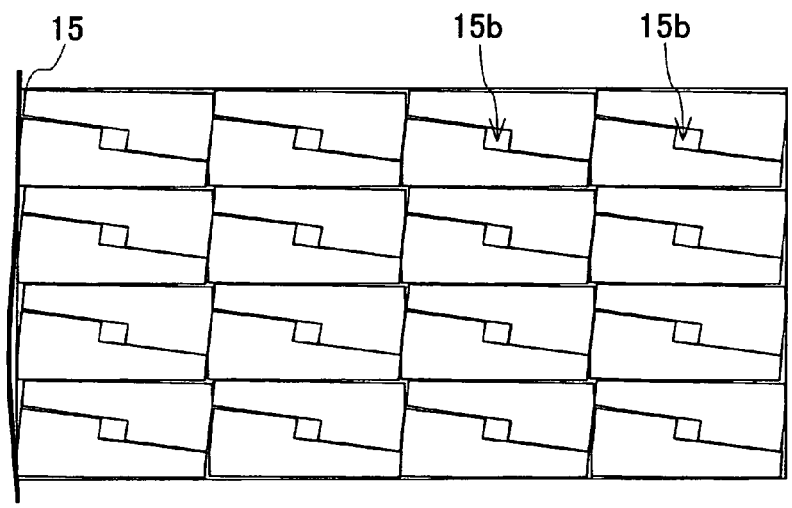
FIG. 4 is a plan view illustrating the steel sheet member after the segment core members have been cut out, according to the embodiment.

Referring to FIGS. 3 and 4, hereinafter is described a method of manufacturing the segment cores 11 according to the present embodiment. FIG. 3 is a plan view illustrating segment-core-shaped outlines (hereinafter also referred to as "segment outlines") 11a arrayed on a thin electromagnetic steel sheet member 15, and segment core members 11b, according to the present embodiment. FIG. 4 is a plan view illustrating the steel sheet member 15 after the segment core members 11b have been cut out, according to the present embodiment.

In the method of manufacturing the segment cores 11 according to the present embodiment, the following first to third steps are sequentially performed. In the method, segment core members (electromagnetic steel plates) 11b each having a shape of an L as viewed from the top are punched out of the steel sheet member 15. Then, a predetermined number of segment core members 11b are laminated to provide the segment core 11.

At the first step, a plurality of first to eighth segment outlines 11a-1 to 11a-8, each corresponding to the shape of the segment core 11 as viewed from the top, are provided on the thin electromagnetic steel sheet member 15, being arrayed in the widthwise direction perpendicular to the longitudinal direction of the steel sheet member 15. In this case, the segment outlines 11a are ensured to be arranged such that the linear edge of the outermost segment outline 11a overlaps the longitudinal edge of the steel sheet member 15 on either side thereof.

In combining the first and second segment outlines 11a-1 and 11a-2, it is ensured that the outer long edge 11g of the first segment outline 11a-1 overlaps one longitudinal edge of the steel sheet member 15. Then, the projection in the yoke portion 11y of the second segment outline 11a-2 is combined with the projection in the yoke portion 11y of the first segment outline 11a-1 arranged as above, being obliquely offset from and opposed to each other. In combining the second segment outline 11a-2, it is ensured that the combined two segment outlines 11a-1 and 11a-2 will have a rectangular outline as a whole.

Thus, the two segment outlines 11a-1 and 11a-2 are arranged such that a face-to-face relationship is established between the inner long edges (11e, 11e) and between the inner short edges (11f, 11f). In the present embodiment, the two segment outlines 11a-1 and 11a-2 are arranged in combination which is used as a minimum unit of combination.

Then, similar to the combination of the first and second segment outlines 11a-1 and 11a-2, the third and forth segment outlines 11a-3 and 11a-4 are combined and arranged. In this case, the third segment outline 11a-3 is arranged such that the outer long edge 11g in the L-shaped acute-angle portion of the third segment outline 11a-3 is ensured to match and contact the outer long edge 11g of the second segment outline 11a-2.

Thus, similar to the combination of the first and second segment outlines 11a-1 and 11a-2, the segment outlines 11a are sequentially combined and arranged regarding the fifth and sixth segment outlines 11a-5 and 11a-6, and the seventh and eighth segment outlines 11a-7 and 11a-8. In other words, with the combination of the two segment outlines 11a as being a minimum unit, a plurality of units are arranged in the widthwise direction perpendicular to the longitudinal direction of the steel sheet member 15. In this case, the eighth segment outline 11a-8 is arranged such that the outer long edge 11g of the segment outline 11a-8 is ensured to overlap the other longitudinal edge of the steel sheet member 15. Subsequently, such a widthwise row of the segment outlines 11a is consecutively provided in the longitudinal direction of the steel sheet member 15, forming a minimum gap between the rows to thereby provide an array of the first to eighth segment outlines 11a-1 to 11a-8.

Such an arrangement of the first to eighth segment outlines 11a-1 to 11a-8 reduces the excess regions located outside the segment outlines 11a. Specifically, as indicated by an arrow 15a in FIG. 3, a small area is defined by two projections in the yoke portions 11.y of so respective two combined segment outlines 11a, which projections are offset from and opposed to each other. These small areas each defined at the center portion between the two combined segment outlines 11a are the only areas left as excess regions.

At the second step, the array of the first to eighth segment outlines 11a-1 to 11a-8 are sequentially punched using a punch, not shown, for a plurality of times on a section-by-section basis to finally cut the segment core members 11b out of the steel sheet member 15. As shown in FIG. 4, after cutting out the segment core members 11b from the steel sheet member 15, the remnants, or waste 15b, corresponding to the respective small areas at the center portions are left. As can be seen from in FIG. 4, the total area occupied by these wastes 15b is very small relative to the entire area of the steel sheet member 15.

Then, at the third step, a predetermined number of segment core members 11b cut out from the steel sheet member 15 at the second step are laminated to provide the segment core 11 shown in FIG. 2. Thus, all the steps are ended.

As described above, according to the method of manufacturing the segment cores 11 according to the present embodiment, two segment outlines 11a are combined as a minimum unit of combination and arranged on the steel sheet member 15 at the first step. In this case, the two segment outlines 11a are arranged such that a face-to-face relationship is established between the inner long edges (11e, 11e) and between the inner short edges (11f, 11f).

Thus, the two segment outlines 11a are arranged mutually utilizing the spaces of the slot-predetermined portions residing in the respective L-shaped right-angle portions of the segment outlines 11a. In this way, the areas of the excess regions (left as wastes) outside the segment outlines 11a are reduced.

Specifically, two segment outlines 11a are combined such that the two projections in the yoke portions 11y of the respective two segment outlines 11a are obliquely opposed to each other. Accordingly, the outline of the combined two segment outlines 11a will have a rectangular outline, leaving only a small area (excess region) at the center of the combination. More specifically, in the steel sheet member 15, the total area of the wastes 15b relative to the entire area of the steel sheet member 15 is very small after cutting out the segment core members 11b. Therefore, the wastes 15b are considerably reduced. Thus, according to the method of manufacturing the segment cores 11 of the present embodiment, material yield in manufacturing the segment cores is enhanced.

In particular, at the first step of the present embodiment, using the combination of two segment outlines 11e as a minimum unit, a plurality of units are arranged in the widthwise direction perpendicular to the longitudinal direction of the steel sheet member 15. Then, the widthwise row of the minimum units are arranged in the longitudinal direction, forming a minimum gap between the rows, to provide an array of the segment outlines 11a. Therefore, space efficiency in the array is enhanced, whereby material yield in manufacturing the segment cores is more favorably enhanced.

The segment cores 11 of the present embodiment, which are manufactured as described above, can contribute to the enhancement of material yield in manufacturing the segment cores.

In the embodiment described above, the minimum units each having substantially a rectangular outline are each horizontally located (as viewed in FIG. 3), or located so that the outer long edge 11g of each segment outline extends along the longitudinal direction of the steel sheet member 15. Alternatively, the minimum units may each be vertically located (as viewed in FIG. 3), or located so that the outer long edge 11g of each segment outline extends along the widthwise direction of the steel sheet member 15.

Figure 5:
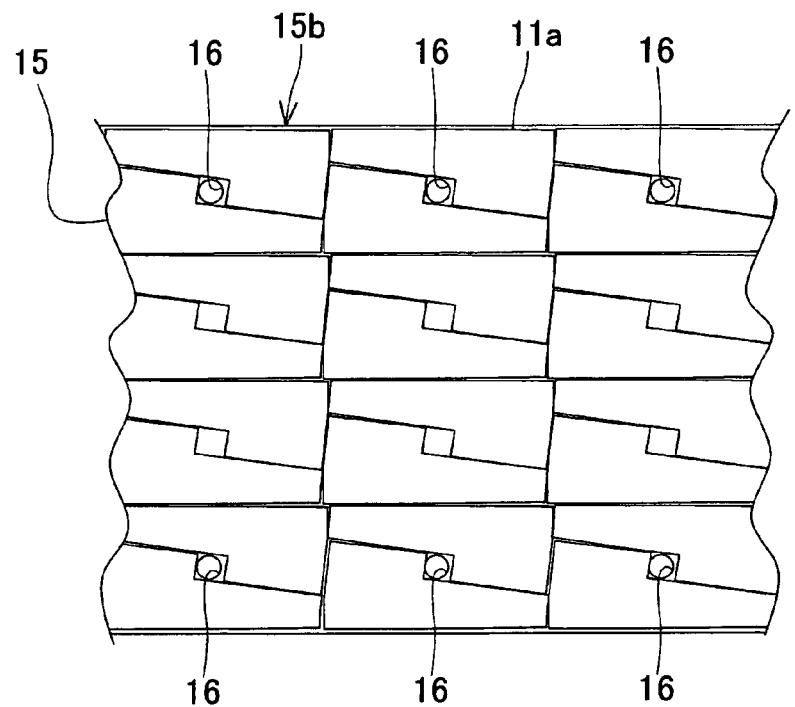
FIG. 5 is a plan view illustrating a steel sheet member after segment core members have been cut out, according to Modification 1.

In the above embodiment, the steel sheet member 15 is not provided with pilot holes for the conveyance or positioning of the steel sheet member 15. However, as shown in FIG. 5, pilot holes 16 may be provided effectively utilizing the excess regions (wastes 15b) in the steel sheet member 15.

(Modifications)

The present disclosure is not limited to the embodiment described above but may be modified in variable manners within a scope not departing from the spirit of the present disclosure. Hereinafter, Modifications 1 to 4 are described. It should be appreciated that, in the modifications, the components identical with or similar to those in the above embodiment are given the same reference numerals for the sake of omitting explanation.

(Modification 1)

FIG. 5 is a plan view illustrating the steel sheet member 15 after segment core members have been cut out, according to Modification 1. The steel sheet member 15 of the first embodiment has not particularly been provided with pilot holes for the conveyance or positioning of the steel sheet member 15. In this regard, as shown in FIG. 5, the steel sheet member 15 of Modification 1 is provided with pilot holes 16 effectively utilizing the portions as the excess regions (waste 15b) in the steel sheet member 15 of the first embodiment. As shown in FIG. 5, the pilot holes 16 are formed in the excess regions each having four directions confronting the segment outlines 11a. Specifically, one pilot hole 16 is formed in each of the minimum units which are located along either longitudinal edge of the steel sheet member 15.

In Modification 1, owing to the provision of the pilot holes 16, the punching process of the steel sheet member 15 is accurately and stably performed.

(Modification 2)

Figure 6:
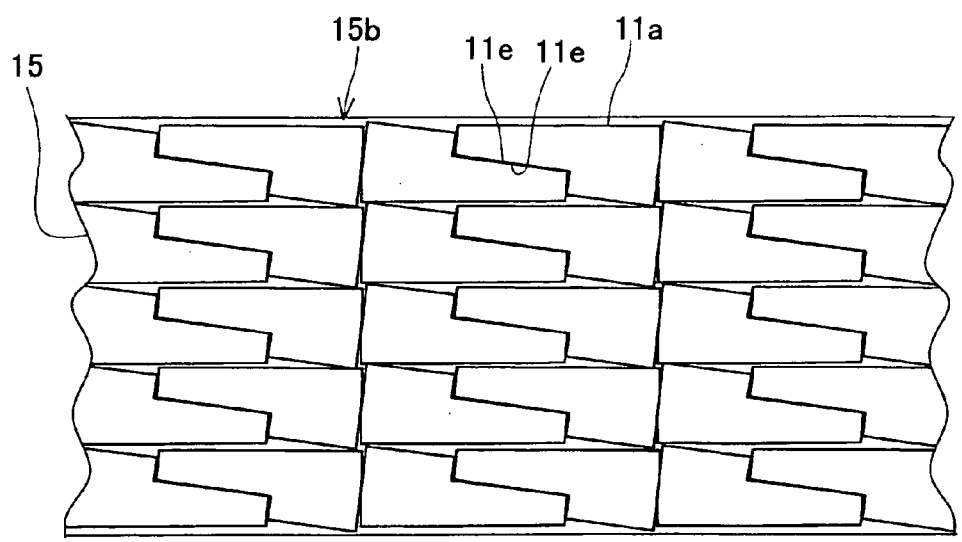
FIG. 6 is a plan view illustrating a steel sheet member after segment core members have been cut out, according to Modification 2.

FIG. 6 is a plan view illustrating the steel sheet member 15 after segment core members have been cut out, according to Modification 2. In the embodiment described above, the two segment outlines 11a forming a minimum unit have been arranged such that a face-to-face relationship is established between the inner long edges (11e, 11e) and between the inner short edges (11f, 11f). In this regard, as shown in FIG. 6, the two segment outlines 11a configuring the minimum unit in Modification 2 are arranged so that only the inner long edges (11e, 11e) are opposed to each other. Also, in Modification 2, five minimum units are arranged in the widthwise direction of the steel sheet member 15.

In Modification 2, the excess regions (wastes 15b) in the steel sheet member 15 are more drastically reduced. Thus, material yield in manufacturing the segment cores is more favorably enhanced.

(Modification 3)

Figure 7:
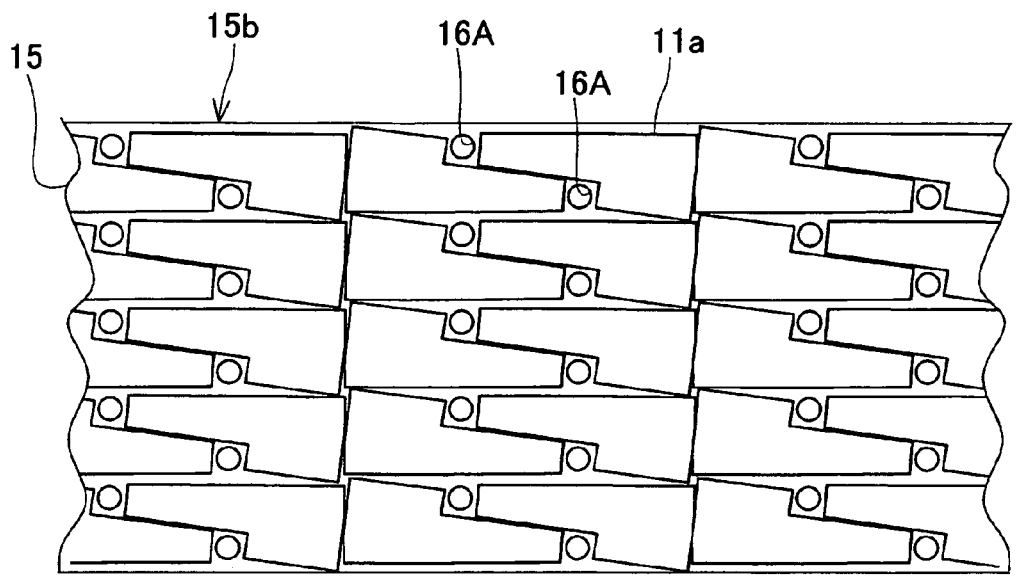
FIG. 7 is a plan view illustrating a steel sheet member after segment core members have been cut out, according to Modification 3.

FIG. 7 is a plan view illustrating the steel sheet member 15 after segment core members have been cut out, according to Modification 3. In Modification 3, the length of the confrontation between the inner long edges (11e, 11e) of the two segment outlines 11a configuring the minimum unit is shortened compared to Modification 2. Specifically, the two segment outlines 11a of the minimum unit are arranged being spaced apart from each other, or being offset from each other, in the longitudinal direction of the steel sheet member 15 to shorten the length of the confrontation.

Then, pilot holes 16A are provided in the excess regions (wastes 15b) formed by the offset arrangement of the two segment outlines 11a configuring each minimum unit. In this case, the pilot hole 16A is formed in each excess region that has at least three directions confronting the segment outlines 11a. For five minimum units arranged in the widthwise direction of the steel sheet member 15, ten pilot holes 16A are formed.

In Modification 3, the pilot holes 16A are provided effectively utilizing the portions as the excess regions (wastes 15b) in the steel sheet member 15. Also, owing to the provision of the pilot holes 16A, the punching process of the steel sheet member 15 is accurately and stably performed.

(Modification 4)

Figure 8:
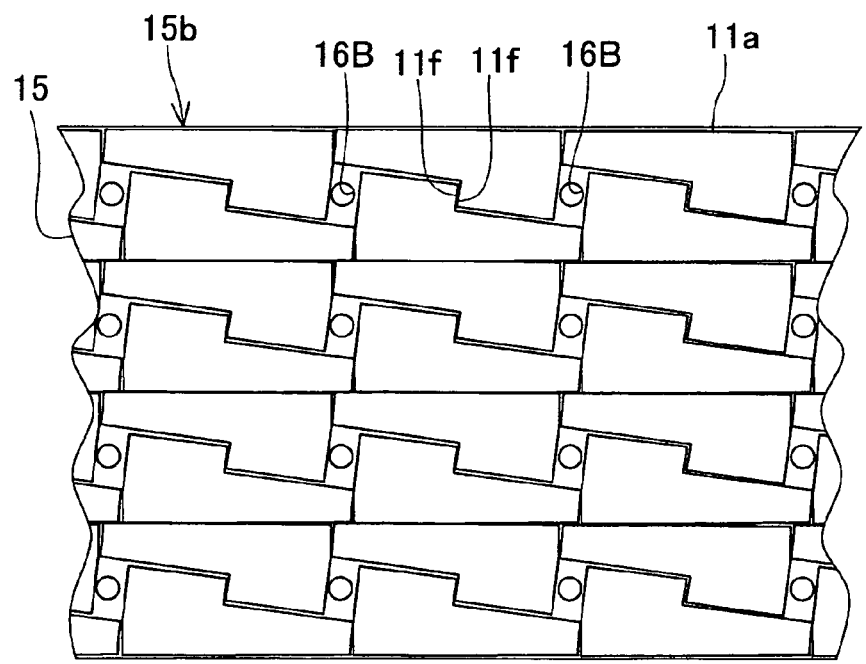
FIG. 8 is a plan view illustrating a steel sheet member after segment core members have been cut out, according to Modification 4.
Figure 9:
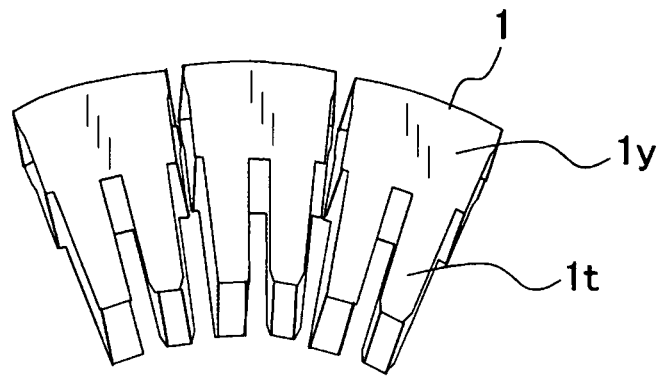
FIG. 9 is a perspective view illustrating the shape of segment cores according to conventional art.
Figure 10:
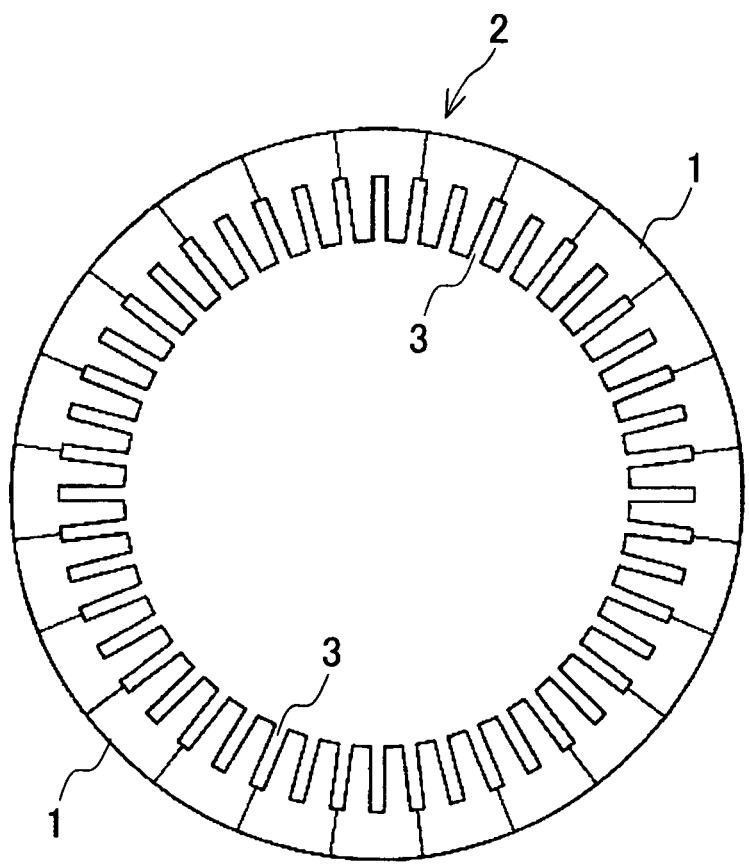
FIG. 10 is a plan view illustrating a stator core obtained by annularly adhering the segment cores according to the conventional art.
Figure 11:
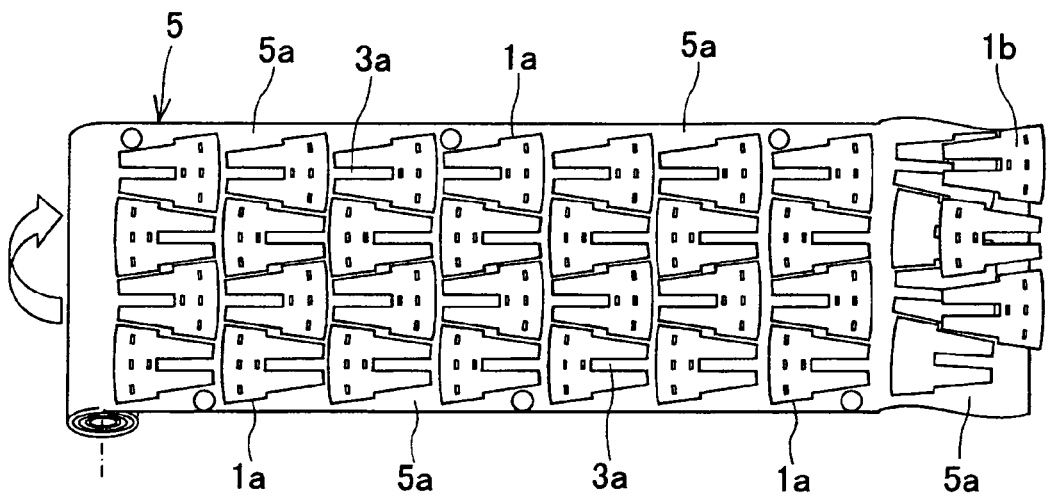
FIG. 11 is a plan view illustrating segment-core-shaped outlines arrayed on a steel sheet member, and segment core members, according to the conventional art.

FIG. 8 is a plan view illustrating the steel sheet member 15 after segment core members have been cut out, according to Modification 4. In Modification 2 described above, the two segment outlines 11a configuring the minimum unit have been arranged such that only the inner long edges (11e, 11e) are opposed to each other. In this regard, the minimum units in Modification 4 are each arranged such that only the inner short edges (11f, 11f) are opposed to each other. Further, in the steel sheet member 15 of Modification 4, pilot holes 16B are provided in the respective excess regions (wastes 15b) each of which faces four segment outlines 11a. Specifically, the pilot hole 16B is provided in each excess region that has two directions confronting the outer short edges (11h, 11h) of two segment outlines 11a, and two directions confronting the inner long edges (11e, 11e) of the remaining two segment outlines 11a.

In Modification 4, the pilot hole 16B is provided on either side of each minimum unit in the longitudinal direction of the steel sheet member 15. Accordingly, the punching process of the steel sheet member 15 is accurately and stably performed.

Thus, the enhancement of material yield and the processability of punching are both satisfied with good balance.

What is claimed is:

1. A segment core forming an annular-shaped stator core of a rotary electric machine that includes a rotor rotating about a rotary axis thereof, the stator core being arranged on an outer periphery side of the rotor with a predetermined distance apart therefrom and being formed into an annular shape by circumferentially connecting a plurality of segment cores, each segment core having a sector-like shape segmented from the annular-shaped stator core, the segment core comprising:

a yoke portion that forms the outer periphery of the stator core;

a tooth portion that extends from the yoke portion to the rotary axis in a radial direction of the stator core; and a steel plate where the yoke portion and the tooth portion are formed;

wherein one edge of the sector-like shape linearly extends along the yoke portion and the tooth portion in the radial direction of the stator core, the other edge of the sector shape forms a projection in the yoke portion jutting out from the tooth portion in the circumferential direction whereby the segment core is formed into a shape of an L as a L-shape outline of the segment core, the steel plate is formed on a steel sheet member such that a plurality of segment outlines each defining the L-shape outline are arranged on the steel sheet member in which a combination of two segment outlines in the plurality of segment lines has a rectangular outline, and the plurality of segment outlines being arranged on the steel sheet member to be punched out based on the segment outlines, the L-shape outline defined by each of the plurality of segment outlines includes a right-angle portion in which an inner long edge intersects an inner short edge to form a corner portion, and the two segment outlines are arranged such that a face-to-face relationship is established at least between the inner long edges or between the inner short edges in the right-angle portions of the two segment outlines.

2. The segment core according to claim 1, wherein the steel plate is laminated in a direction parallel to the axial direction of the rotor.

3. A method for manufacturing a segment core forming an annular-shaped stator core of a rotary electric machine that includes a rotor rotating about a rotary axis thereof, the stator core being arranged on an outer periphery side of the rotor with a predetermined distance apart therefrom and being formed into an annular shape by circumferentially connecting a plurality of segment cores, each segment core having a sector-like shape segmented from the annular-shaped stator core, the segment core including a yoke portion that forms the outer periphery of the stator core; a tooth portion that extends from the yoke portion to the rotary axis in a radial direction of the stator core; and a steel plate where the yoke portion and the tooth portion are formed; wherein one edge of the sector-like shape linearly extends along the yoke portion and the tooth portion in the radial direction of the stator core, the other edge of the sector shape forms a projection in the yoke portion jutting out from the tooth portion in the circumferential direction whereby a segment core is formed into a shape of an L, the method comprising steps of:

forming the steel plate on a steel sheet member such that a plurality of segment outlines each defining the L-shape outline are arranged on the steel sheet member in which a combination of two segment outlines in the plurality of segment lines has a rectangular outline, the L-shape outline defined by each of the plurality of segment outlines including a right-angle portion in which an inner long edge intersects an inner short edge to form a corner portion;

arranging the two segment outlines such that a face-to-face relationship is established at least between the inner long edges or between the inner short edges in the right-angle portions of the two so segment outlines;

punching out the steel plate from the steel sheet member based on the two segment outlines; and laminating the steel plate which is punched out from the steel sheet member to produce the segment core.

4. The method according to claim 3, wherein arranging the two segment outlines in combination as a minimum unit of combination, and arranging a plurality of units to be arrayed in a widthwise direction perpendicular to a longitudinal direction of the steel sheet member.

5. The method according to claim 3, wherein arranging the two segment outlines such that a face-to-face relationship is established between the inner long edges and between the inner short edges in the right-angle portions of the two segment outlines.

6. The method according to claim 4, wherein arranging the two segment outlines such that a face-to-face relationship is established between the inner long edges and between the inner short edges in the right-angle portions of the two segment outlines.

7. The method according to claim 3, wherein a pilot hole used for conveyance of the steel member is provided in excess regions each having at least three directions confronting the segment outlines.

8. The method according to claim 4, wherein a pilot hole used for conveyance of the steel member is provided in excess regions each having at least three directions confronting the segment outlines.

9. The method according to claim 5, wherein a pilot hole used for conveyance of the steel member is provided in excess regions each having at least three directions confronting the segment outlines.

* * * * *